United States Patent
Yuasa et al.

(10) Patent No.: US 7,065,230 B2
(45) Date of Patent: Jun. 20, 2006

(54) IMAGE PROCESSING SYSTEM AND DRIVING SUPPORT SYSTEM

(75) Inventors: Mayumi Yuasa, Kanagawa-ken (JP); Kazuhiro Fukui, Kanagawa-ken (JP); Osamu Yamaguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 760 days.

(21) Appl. No.: 10/153,806

(22) Filed: May 24, 2002

(65) Prior Publication Data

US 2003/0039378 A1    Feb. 27, 2003

(30) Foreign Application Priority Data

May 25, 2001    (JP) .......................... P2001-156914

(51) Int. Cl.
*G06K 9/00* (2006.01)

(52) U.S. Cl. ..................................... 382/104; 382/118

(58) Field of Classification Search ................ 382/103, 382/104, 115, 118, 218; 351/200, 206, 209, 351/210, 221, 246; 701/23; 340/5.53, 5.58, 340/5.83
See application file for complete search history.

(56) References Cited

U.S. PATENT DOCUMENTS

| 5,912,721 A * | 6/1999 | Yamaguchi et al. ........ 351/210 |
| 5,982,912 A * | 11/1999 | Fukui et al. ................ 382/118 |
| 6,111,580 A * | 8/2000 | Kazama et al. ............. 715/863 |
| 6,181,805 B1 * | 1/2001 | Koike et al. ................ 382/118 |
| 6,246,779 B1 | 6/2001 | Fukui et al. |
| 6,578,962 B1 * | 6/2003 | Amir et al. ................. 351/209 |

FOREIGN PATENT DOCUMENTS

| JP | 01-178700 | 12/1989 |
| JP | 4-225478 | 8/1992 |
| JP | 6-261863 | 9/1994 |
| JP | 9-259282 | 10/1997 |
| JP | 11-175246 | 7/1999 |

OTHER PUBLICATIONS

Notice of Rejection dated Nov. 1, 2005 from the Japanese Patent Office for Japanese Patent Application No. 2001-156914.

Baluja, Shumeet et al., "Non-Intrusive Gaze Tracking Using Artificial Neural Networks", School of computer Science, Carnegie Mello University, pp. 1–14, (Jan. 1994).

(Continued)

*Primary Examiner*—Jingge Wu
*Assistant Examiner*—Abolfazl Tabatabai
(74) *Attorney, Agent, or Firm*—Finnegan, Henderson, Farabow, Garrett & Dunner, L.L.P.

(57) ABSTRACT

An image input unit inputs an image including a user's face area to specify the user's gaze or face direction. A pattern generation unit generates an input pattern that can be compared with each dictionary pattern from the image. A dictionary unit previously stores a plurality of dictionary patterns each of which differently corresponds to the user's gaze or face direction. A pattern comparison unit respectively calculates a similarity degree between the input pattern and each of the dictionary patterns by comparing the input pattern with each of the dictionary patterns. A gaze detection unit detects the user's gaze or face direction based on the similarity degree.

11 Claims, 7 Drawing Sheets

OTHER PUBLICATIONS

Kazuhir, Fukui et al., "Face Recognition under Variable Lighting Condition with Constrainted Mutual Subspace Method- Learning of Constraint Subspace to Reduce Influence of Lighting Changes", vol. J82 D II, No. 4 pp. 613-620, (Apr. 1999).

Maeda, Ken-ichi et al., "A Pattern Matching Method with Local Structure", vol. J68-D. No. 3., pp. 345-352, (Mar. 1985).

Kazuhir, Fukui et al., "Facial Feature Point Extraction Method Based on Combination of Shape Extraction and Pattern Matching", vol. J80 -D II, No. 8 pp. 2170-2177, (Aug. 1997).

Oja, E. et al., "Subspace Methods of Pattern Recognition", Research Studies Press Ltd., pp. x-xii, 1, and 88-91, (1986).

Pappu, R. et al., "A Qualitative Approach to Classifying Gaze Direction", Proceedings of the 3rd International conference on Face and Gesture Recognition, pp. 160-165, (Apr. 1998).

Yuasa, Mayumi et al., "An Image Processing Apparatus and Method", U.S. Appl. No. 09/522,597 filed Mar. 10, 2000.

* cited by examiner

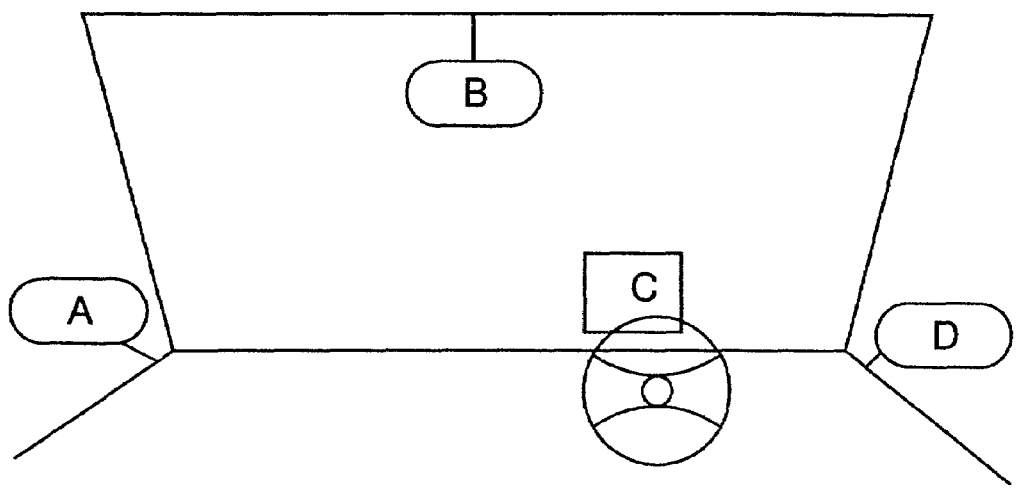
FIG.3
 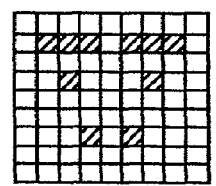
FIG.4A   FIG.4B

IMAGE PROCESSING SYSTEM AND DRIVING SUPPORT SYSTEM

CROSS-REFERENCE TO RELATED APPLICATIONS

This application is based upon and claims the benefit of priority from the prior Japanese Patent Application PH2001-156914, filed on May 25, 2001, the entire contents of which are incorporated herein by reference.

FIELD OF THE INVENTION

The present invention relates to an image processing system and a driving support system for detecting a user's gaze who is driving a vehicle and for supporting the user's driving based on the detection result.

BACKGROUND OF THE INVENTION

Detection of a driver's status in a vehicle is used for deciding whether the driver is under a condition of safe driving. Briefly, it is an effective means to prevent a traffic accident such as sleepy driving or aside driving. Especially, a gaze clearly represents the driver's conscious condition. Accordingly, a technique to detect the gaze is very effective.

In the prior art, as a method for detecting a user's gaze direction, a first method using a reflected image of the eyeball by irradiating infrared rays and a second method using image processing exist.

As the first method, for example, a technique described in Japanese Patent Disclosure (Kokai) PH6-261863 is known. However, in this technique, the user feels great burden because the infrared ray is directly irradiated to the eyeball by a radiation diode.

As the second method, a technique described in Japanese Patent Disclosure (Kokai) PH4-225478 is known. In this second technique, the edge of the pupil is detected and the gaze is calculated by a center coordinate of the pupil. However, this technique is not stable for variation of illumination and it is necessary to calculate a face direction and position by another means.

As a method to solve the above-mentioned problem of the image processing, as shown in Japanese Patent Disclosure (Kokai) PH11-175246, a technique using a face area or a pupil area is known. In this additional technique, a stable method for detecting the gaze can be realized for variation of illumination or variation of head position. However, in this method, if the face area or the pupil area cannot be detected, a problem that the gaze direction cannot be detected exists.

SUMMARY OF THE INVENTION

It is an object of the present invention to provide an image processing system and a driving support system to simply detect the user's gaze or face direction during driving the vehicle.

According to the present invention, there is provided an image processing apparatus, comprising: an image input unit configured to input an image including a user's face area to specify the user's gaze or face direction; a pattern generation unit configured to generate an input pattern that can be compared with each dictionary pattern from the image; a dictionary unit configured to previously store a plurality of dictionary patterns each of which differently corresponds to the user's gaze or face direction; a pattern comparison unit configured to respectively calculate a similarity degree between the input pattern and each dictionary pattern by comparing the input pattern with each dictionary pattern; and a gaze detection unit configured to detect the user's gaze or face direction based on the similarity degree.

Further in accordance with the present invention, there is also provided a driving support apparatus for a driver of a vehicle, comprising; an image input unit configured to input an image including the driver's face area to specify the user's gaze or face direction; a pattern generation unit configured to generate an input pattern that can be compared with each dictionary pattern from the image; a dictionary unit configured to previously store a plurality of dictionary patterns each of which differently corresponds to the driver's gaze or face direction; a pattern comparison unit configured to respectively calculate a similarity degree between the input pattern and each dictionary pattern by comparing the input pattern with each dictionary pattern; a gaze detection unit configured to detect the driver's gaze or face direction based on the similarity degree; an obstacle detection area selection unit configured to select an area outside of the driver's view based on the driver's gaze or face direction, the area representing an obstacle detection area for the vehicle; and an obstacle detection unit configured to detect an obstacle existing in the obstacle detection area.

Further in accordance with the present invention, there is also provided an image processing method, comprising: inputting an image including a user's face area to specify the user's gaze or face direction; generating an input pattern that can be compared with each dictionary pattern from the image; previously storing a plurality of dictionary patterns each of which differently corresponds to the user's gaze or face direction; respectively calculating a similarity degree between the input pattern and each dictionary pattern by comparing the input pattern with each dictionary pattern; and detecting the user's gaze or face direction based on the similarity degree.

Further in accordance with the present invention, there is also provided a driving support method for a driver of a vehicle, comprising: inputting an image including the driver's face area to specify the driver's gaze or face direction; generating an input pattern that can be compared with each dictionary pattern from the image; previously storing a plurality of dictionary patterns each of which differently corresponds to the driver's gaze or face direction; respectively calculating a similarity degree between the input pattern and each dictionary pattern by comparing the input pattern with each dictionary pattern; detecting the driver's gaze or face direction based on the similarity degree; selecting an area outside of the driver's view based on the driver's gaze or face direction, the area representing an obstacle detection area for the vehicle; and detecting an obstacle existing in the obstacle detection area.

Further in accordance with the present invention, there is also provided a computer program product, comprising: a computer readable program code embodied in said product for causing a computer to process an image, said computer readable program code having: a first program code to input an image including a user's face area to specify the user's gaze or face direction; a second program code to generate an input pattern that can be compared with each dictionary pattern from the image; a third program code to previously store a plurality of dictionary patterns each of which differently corresponds to the user's gaze or face direction; a fourth program code to respectively calculate a similarity degree between the input pattern and each dictionary pattern by comparing the input pattern with each dictionary pattern;

and a fifth program code to detect the user's gaze or face direction based on the similarity degree.

Further in accordance with the present invention, there is also provided a computer program product, comprising: a computer readable program code embodied in said product for causing a computer to support driving of a vehicle, said computer readable program code having: a first program code to input an image including the driver's face area to specify the driver's gaze or face direction; a second program code to generate an input pattern that can be compared with each dictionary pattern from the image; a third program code to previously store a plurality of dictionary patterns each of which differently corresponds to the driver's gaze or face direction; a fourth program code to respectively calculate a similarity degree between the input pattern and each dictionary pattern by comparing the input pattern with each dictionary pattern; a fifth program code to detect the driver's gaze or face direction based on the similarity degree; a sixth program code to select an area outside of the driver's view based on the driver's gaze or face direction, the area representing an obstacle detection area for the vehicle; and a seventh program code to detect an obstacle existing in the obstacle detection area.

BRIEF DESCRIPTION OF THE DRAWINGS

FIG. 3 is a schematic diagram of a plurality of targets used as each index of a driver's gaze according to an embodiment of the present invention.

FIGS. 4A and 4B are examples of an input image and a bit pattern of the driver's face according to an embodiment of the present invention.

DETAILED DESCRIPTION OF THE EMBODIMENT

Figure 1:
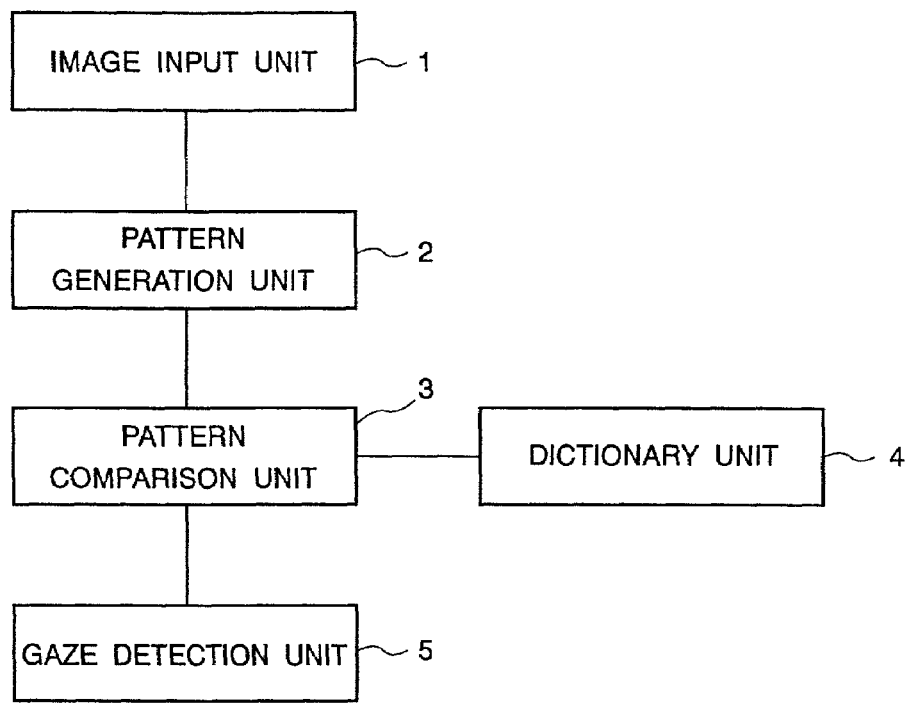
FIG. 1 is a block diagram of an image processing apparatus according to a first embodiment of the present invention.

Various embodiments of the present invention will be explained by referring to the drawings. First, the image processing apparatus of the first embodiment of the present invention is explained. In the first embodiment, the user (such as a driver) can control a camera to input his/her head area including at least one part of his/her face. After the camera inputs the image, the driver's gaze is detected by pattern recognition.

FIG. 1 is a block diagram of the image processing apparatus applied to the driving support apparatus according to the first embodiment. As shown in FIG. 1, the image processing apparatus includes an image input unit 1, a pattern generation unit 2, a pattern comparison unit 3, a dictionary unit 4, and a gaze detection unit 5. In these units, each function of the pattern generation unit 2, the pattern comparison unit 3, the dictionary unit 4 and the gaze detection unit 5 can be realized by program instructions or codes recorded in a computer.

Figure 2:
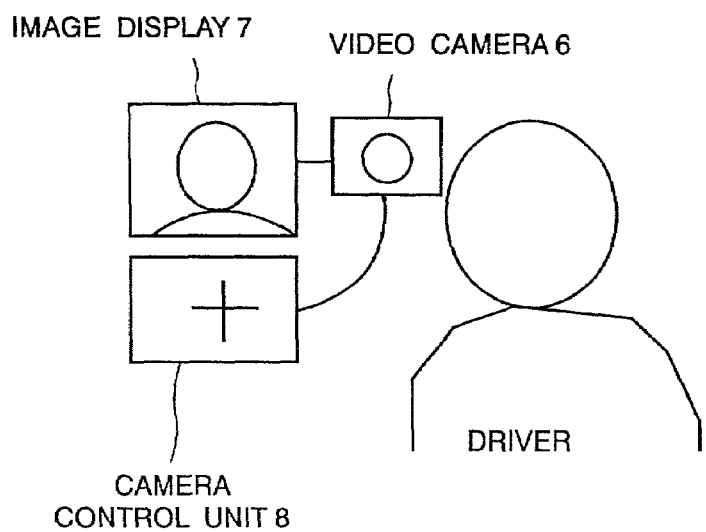
FIG. 2 is a block diagram of an image input unit of the image processing apparatus shown in FIG. 1.

FIG. 2 is a block diagram of the image input unit 1. The image input unit 1 includes a video camera 6, an image display 7, and a camera control unit 8. The video camera 6 is located at a position to input an image of the driver's head area including at least one part of his/her face in the vehicle. In the first embodiment, the input image is a dynamic series of images overtime of the driver's face image. However, the driver may specify the gaze used as the input image. The image display 7 is, for example, a liquid crystal display apparatus to display the image input from the video camera 6. Ordinarily, the driver's face area is displayed through the image display 7. The image display is located at a position where the driver can easily watch and where it does not prevent driving. Furthermore, the image display 7 can be united with a display apparatus for presenting information for the driver such as a car navigation system. The camera control unit 8 is consisted of a lever or a cursor on a touch panel. The camera control unit 8 can set one or more parameters such as the posture of the video camera 6 by the driver's operation.

Next, concrete operation of the image is explained. Before driving the vehicle, the driver executes following operation as preparation. While the driver is watching the image display 7, he/she adjusts the posture of the video camera 6 by the camera control unit 8 so that his/her face area is certainly included in the image and the other area is included as few as possible. Briefly, in the image input unit 1, the driver can set a condition that a face area is included and the other area is not almost included in the input image by simple operation. As a result, following processing can be greatly reduced.

Next, in FIG. 1, the pattern generation unit 2 converts each of the dynamic image data inputted from the image input unit 1 to a pattern that can be compared with each dictionary pattern stored in the dictionary unit 4. As the image data is normal, digital data or conversion data from analogue signal to digital signal is used. However, the image data itself may be too large information for pattern matching. Accordingly, by extracting representative pixel or average processing, the image data is converted to data suitable for pattern matching. For example, the image is divided into a plurality of areas each of which is "15×15" pixels. In each divided area, an average value of all pixel values is calculated. A set of the average value of each area in the image is used as an input pattern. This operation is called mosaicking.

In FIG. 1, the pattern comparison unit 3 compares the input pattern generated from the pattern generation unit 2 with each dictionary pattern stored in the dictionary unit 4. Each dictionary pattern corresponds to each target previously located. The dictionary pattern will be explained in detail afterward.

In this case, a pattern similarity degree between the input pattern and the dictionary pattern may be calculated by any pattern recognition technique. One such pattern recognition technique is called the subspace method disclosed in "Subspace Methods of Pattern Recognition"; Dr. E. Oja, Research Studies Press Ltd., PP. 89–90(1986). This similarity degree represents an evaluation value of how closely the driver gazes at the target.

(1) Application of the Subspace Method:

Assume that the image pattern is regarded as a vector of n×n dimension. In a feature space of n×n dimension, a subspace of some category is represented as a linear subspace in which a plurality of base vectors span. In this case, angle θ of the input vector (input pattern) projected on to a subspace of some category represents how the input vector is similar to the category. Accordingly, angle θ between the input vector and the subspace of each category is calculated. The category of the subspace of which the angle θ is smallest is decided as the category to which the input pattern (input vector) belongs.

Concretely, the angle θ is calculated by following expression.

$$\cos^2\theta = \frac{\sum_{i=1}^{L}(vect. \ eigenvect_i)^2}{|vect|^2} \quad (1)$$

In above expression (1), "L" represents the number of eigenvectors forming the subspace of each category, "(vect. eigenvect$_i$)" represents a product between the input vector and i-th eigenvector.

(2) Application of the Mutual Subspace Method:

The processing by the subspace method can be replaced by another known pattern recognition technique called the mutual subspace method using a plurality of input patterns. The mutual subspace method is disclosed in "A pattern Matching Method with Local Structure"; Ken-ichi MAEDA and Sadakazu Watanabe, vol. J68-D. No. 3. pp. 345–352 (1985). By using the mutual subspace method, a more stable gaze detection can be executed.

In the mutual subspace method, both the input side and the dictionary side are represented as the subspace, and "cos²θ" of angle "θ" between the input subspace and the dictionary subspace is regarded as the similarity degree. In this case, "cos²θ" is represented as the following equation.

$$\cos^2\theta = \sup_{\substack{u \in P, v \in Q \\ \|u\| \neq 0, \|v\| \neq 0}} \frac{|(u,v)|^2}{\|u\|^2 \|v\|^2} \quad (2)$$

The projection matrix to the input subspace P is represented as P, and the projection matrix to the dictionary subspace Q is represented as Q. In this case, cos²θ of angle θ between subspaces P and Q is the eigenvalue of QPQ or PQP.

This eigenvalue problem may be replaced by an eigenvalue problem of a small dimension number. Assume that the eigenvector of QPQ is v∈Q, φ and ψ are respectively the base vectors of subspaces P and Q. The following expressions are represented.

$$P = \sum_{m=1}^{M} \langle \phi_m, \phi_m \rangle \quad (3)$$

$$Q = \sum_{n=1}^{N} \langle \psi_n, \psi_n \rangle \quad (4)$$

The eigenvalue problem of QPQ is represented as the following expression.

$$QPQv = \lambda v \quad (5)$$

$$v = \sum_{k=1}^{N} C_k \psi_k \ (v \in Q) \quad (6)$$

The equation (6) is substituted to the right side of the equation (5).

$$\lambda v = \sum_{k=1}^{N} \lambda C_k \psi_k \quad (7)$$

On the other hand, the equations (3) and (4) are substituted to left side of the equation (5).

$$QPQv = \sum_{k=1}^{N} \sum_{i=1}^{N} \sum_{m=1}^{M} \sum_{n=1}^{N} \langle \psi_i, \psi_i \rangle \langle \phi_m, \phi_m \rangle \langle \psi_n, \psi_n \rangle C_k \psi_k \quad (8)$$

The equation (8) is arranged by changing the order of calculation.

$$QPQv = \sum_{k=1}^{N} \sum_{m=1}^{M} \sum_{n=1}^{N} (\psi_k, \phi_m)(\phi_m, \psi_n) C_n \psi_k \quad (9)$$

In the equations (7) (9), the same parameter ψk is aimed as follows.

$$\lambda CK = \sum_{m=1}^{M} \sum_{n=1}^{N} (\psi_k, \phi_m)(\phi_m, \psi_n) C_n \quad (10)$$

In this case, assume the following replacement.

$$C=(C_1, C_2, \ldots, C_N) \quad (11)$$

$$X=(X_{ij}) \quad (12)$$

$$X_{ij} = \sum_{m=1}^{M} (\psi_i, \phi_m)(\psi_m, \phi_j) \quad (13)$$

The equation (10) is regarded as the eigenvalue problem of matrix X as follows.

$$\lambda c = Xc \quad (14)$$

The maximum eigenvalue of X is represented as "$\cos^2\theta_1$" of minimum angle $\theta_1$. The second eigenvalue is "$\cos^2\theta_2$" of the angle along the perpendicular direction of the maximum angle. In the same way, hereinafter, $\cos^2\theta_i$ (i=1, ..., N) is calculated in order. The angle $\theta_i$ (i=1, ..., N) is well known as a canonical angle between two subspaces.

(3) Application of the Constraint Mutual Subspace Method:

Furthermore, the mutual subspace method can be replaced by yet another known pattern recognition technique known as the constraint mutual subspace method in order to execute more suitable gaze detection. The constraint mutual subspace method is disclosed in "Face Recognition under Variable Lighting Condition with Constraint Mutual Subspace Method"; Kazuhiro FUKUI et al., vol. J82 DII, No. 4. pp. 613–620(1997). In the above reference, the constraint mutual subspace method is utilized for person identification. However, in the first embodiment, each person is replaced by each target at which the driver should gaze. In this case, in the dictionary unit 4, a difference dictionary subspace between two targets and a self-variation subspace in each target are generated, and a constraint subspace is generated from the difference dictionary subspace and the self-variation subspace.

In FIG. 1, the dictionary unit 4 collects a plurality of images of face area while the driver gazes at each target previously located. Then, the dictionary unit 4 holds or stores the dictionary pattern generated from the plurality of images for each target.

Next, the recognition method and the dictionary generation method using the constraint mutual subspace method are explained. First, the target as an index of the driver's gaze is fixed. For example, FIG. 3 shows four targets A~D in a vehicle. In FIG. 3, a target A is a side mirror of the left side, a target B is a back minor, a target C is a meter, and a target D is a side mirror of the right side. In the first embodiment, the dictionary subspace is created for each target A, B, C, D. Creation of the dictionary subspace is executed as follows.

Figure 5A:
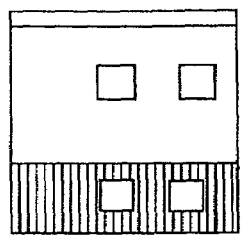
FIGS. 5A, 5B, 5C and 5D are examples of input pattern of the driver's face in correspondence with targets A, B, C and D shown in FIG. 3.
Figure 5B:
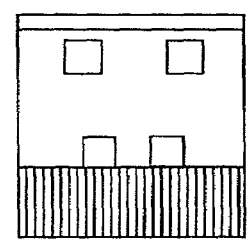
Figure 5C:
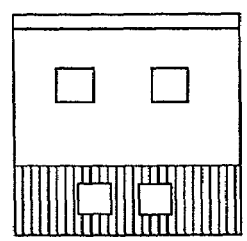
Figure 5D:
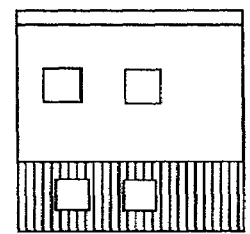

At the first step, image sample of the user's gaze or face direction at each target is collected. FIG. 4A shows an example of the input image of the user's face area. FIG. 4B shows a bit pattern of the input image of FIG. 4A. As shown in FIG. 4B, facial feature points such as pupils and nostrils are extracted from the input image (In this case, the facial feature points may not be extracted from the input image.). As a result, positions of the facial feature points in the input image change in correspondence with location of the target. For example, FIG. 5A shows the input pattern of the user's face image corresponding to the target A, FIG. 5B shows the input pattern of the user's face image corresponding to the target B, FIG. 5C shows the input pattern of the user's face image corresponding to the target C, FIG. 5D shows the input pattern of the user's face image corresponding to the target D.

At the second step, for example, the input image is divided into a plurality of area each of which size is "15×15" pixels. An average value of all pixel values in each area is calculated. As mentioned-above, the input image is converted as mosaicking. This mosaic image is called a normalized image.

At the third step, if necessary, a histogram flat processing, a differential processing, an emboss processing, or a Fourier transform, is executed for the normalized image. Each pixel of the normalized image is arranged in order, which is called a feature vector.

At the fourth step, as for the feature vector corresponding to each target, KL expansion is executed, and the eigenvalue and the eigenvector are calculated.

At the fifth step, in case that the eigenvalue is arranged in order of larger value, the eigenvector corresponding to each of a plurality of eigenvalues of high rank is extracted as a base vector. A subspace in which the base vectors span is called a dictionary subspace. For example, the number of dimension is ten.

At the sixth step, a difference subspace between two dictionary subspaces corresponding to two neighboring targets is calculated. In FIG. 3, two neighboring targets are (A, B), (A, C), (B, C), (B, D), (C, D). As for the two neighboring targets, a difference between the input patterns of the two neighboring targets is few. Accordingly, the difference subspace is a space emphasizing the difference between the input patterns of the two neighboring targets.

Figure 6:
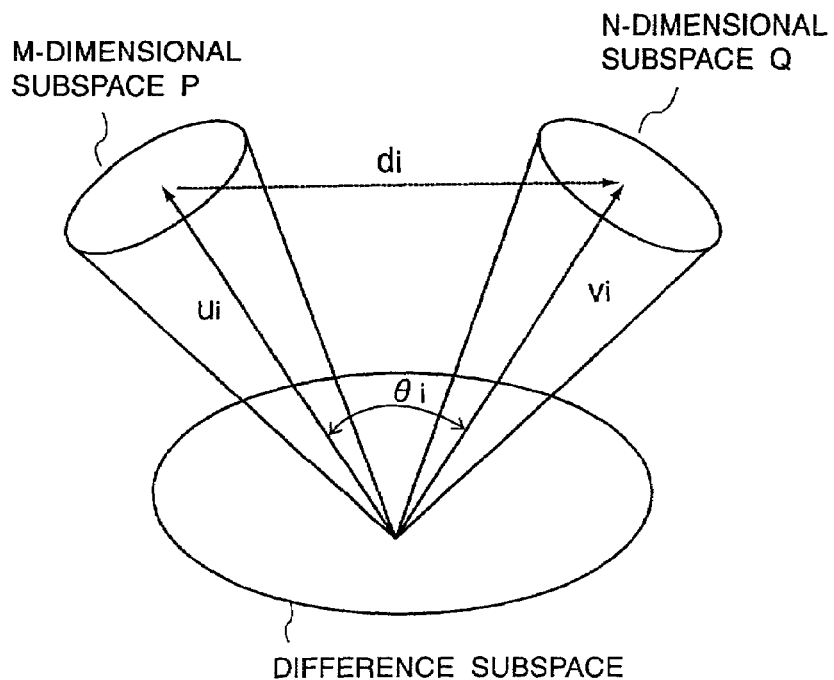
FIG. 6 is a schematic diagram of a difference subspace according to an embodiment of the present invention.

The difference subspace is defined as follows. As shown in FIG. 6, a canonical angle $\theta_i$ of N(=<M) units is determined for M-dimensional subspace P and N-dimensional subspace Q. In this case, a difference vector $d_i$ between two vectors $u_i$ and $v_i$ forming the canonical angle $\theta_i$ is defined. The difference vectors $d_i$ of N units are mutually orthogonal. The difference vectors of D units (from the first difference vector $d_1$ to the D-th difference vector $d_D$) are extracted from N units, and normalized as a length "1.0". This normalized difference vectors of D units are regarded as a base vector of D-dimension difference subspace $D_{PQ}$.

$$u_i = \sum_{k=1}^{M} cu_i[k] \times \phi[k] \tag{15}$$

$$v_i = \sum_{k=1}^{N} cv_i[k] \times \psi[k] \tag{16}$$

$$d_i = u_i - v_i \tag{17}$$

In above formulas (15) and (16), coefficient $cu_i$ is the eigenvector calculated from the eigenvalue problem of the formula (14). Furthermore, coefficient $cv_i$ is the eigenvector calculated from the formula (14) after "$\phi$" and "$\psi$" are replaced in the formula (13).

Figure 7:
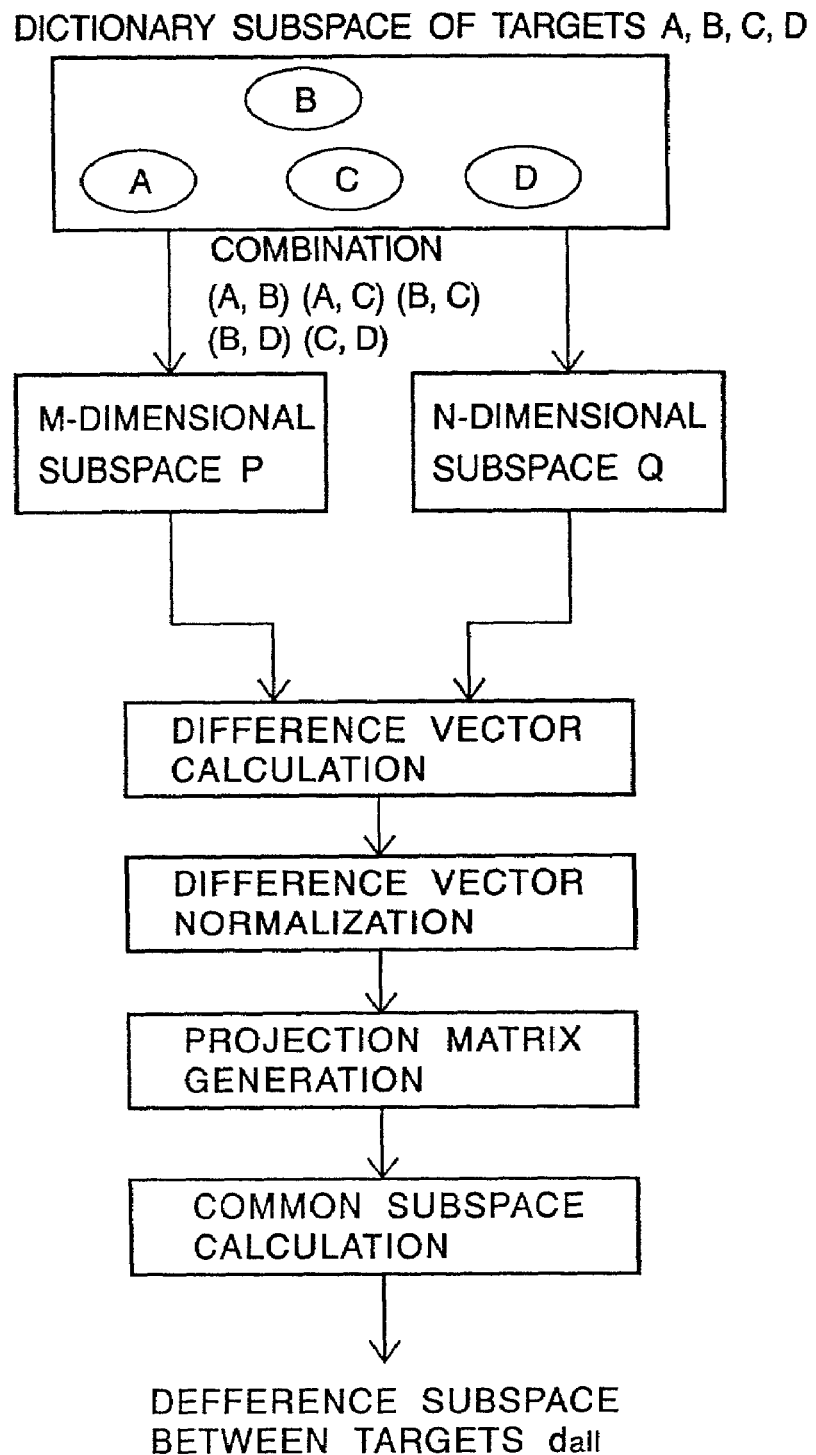
FIG. 7 is a flow chart of generation process of a difference subspace between targets according to the first embodiment of the present invention.

FIG. 7 is a flow chart of an example generation process of a difference subspace between targets according to the first embodiment of the present invention. In this case, as with a combination to create a concrete difference subspace, a combination of the dictionary subspace of two targets neighboring in space such as (A, B) (A, C) (B, C) (B, D) (C, D) is utilized. However, all combinations of the dictionary subspace of two targets may be utilized. In this way, the difference subspace between two dictionary subspaces of two targets is called a difference subspace d between targets. Last, a plurality of the difference subspaces d between targets are unified and called a difference subspace $d_{all}$ between targets. As shown in FIG. 7, the difference subspace $d_{all}$ between targets is determined as a common subspace of all difference subspaces d between targets.

Now, calculation of the common subspace of the difference subspace d of N units (N=${}_mC_2$) is explained. Assume that a projection matrix of the k-th difference subspace d is $P_k$, and a generation matrix of weighed sum of each projection matrix is G.

$$G = \sum_{k=1}^{N} \alpha_k p_k \qquad (18)$$

$\alpha_k$: positive real number satisfying $$\text{``}\sum_{K=1}^{N} \alpha_k = 1.0\text{''}$$

The common subspace of the difference subspace of N units is determined as a space in which the eigenvectors of the generation matrix G span.

Furthermore, in order to suppress distribution of the input pattern for the user's gaze at each target, a constraint subspace based on self-variation is created. In general, even if the same user gazes the same target, whenever the same user gazes at different time, the input pattern of the user's face image changes. However, by creating a self-variation subspace, variation of the input pattern of the same user for the same target is prevented. Concretely, a plurality of images of the user's face area are inputted at different times whenever the same user gazes the same target at the different times. A subspace is generated from the plurality of images of each input time, and a difference subspace between two subspaces is generated for each combination of two different times for the same target. This generation process is executed for each target. The difference subspace is called the self-variation subspace S.

Figure 8:
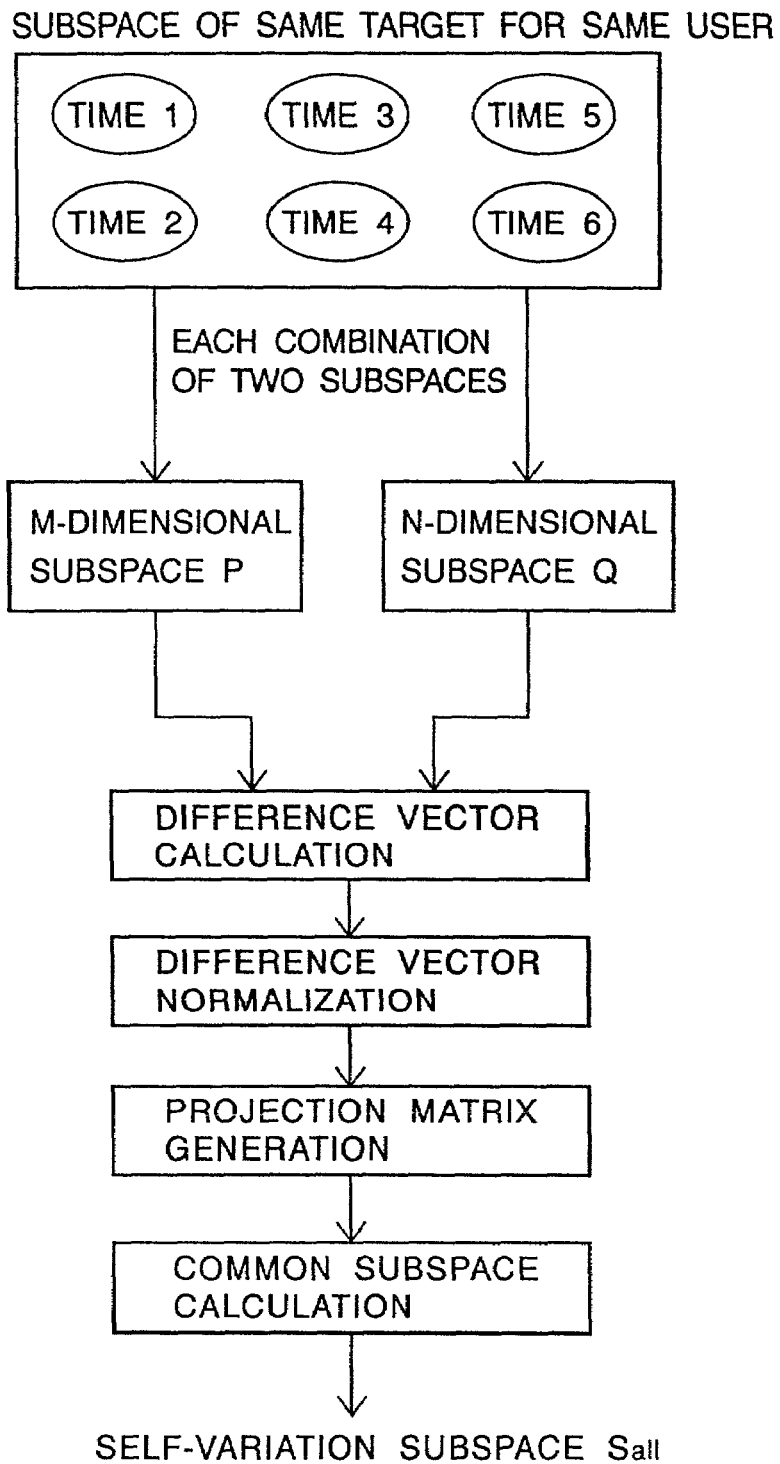
FIG. 8 is a flow chart of generation process of a self-variation subspace according to the first embodiment of the present invention.

FIG. 8 is a flow chart of an example generation process of the self-variation subspace according to the first embodiment of the present invention. As shown in FIG. 8, a common subspace of the self-variation subspace S of each target is calculated and called a self-variation subspace $S_{all}$. In order to emphasize a difference between dictionary subspaces of two neighboring targets and to suppress a variation of dictionary subspace of different times for the same target, the self-variation subspace $S_{all}$ is subtracted from the difference subspace $d_{all}$ between targets. This subtraction result is called a constraint subspace C.

Concretely, as for the difference subspace between targets and the self-variation subspace, a subspace, where the evaluation standard f is maximum, is determined as a constraint subspace. In this case, a decision standard of Fisher is utilized. The decision standard of Fisher is a ratio of a distribution between different classes and a distribution in the same class. Additionally, the evaluation standard f is an evaluation quantity which projection element of the self-variation subspace (N2-dimension) is subtracted from projection element of the difference subspace between targets (N1-dimension). Assume that a matrix of which column is a normal base vector of the constraint subspace to be determined is C.

$$f = \sum_{i=1}^{N1} |Cb_i|^2 - \sum_{i=1}^{N2} |Cs_i|^2 \qquad (19)$$

The first item of the formula (19) represents that, when the i-th base vector $b_i$ of the difference subspace between targets $d_{all}$ is projected onto the constraint subspace, the sum of the projection length $Cb_i$ is as large as possible. On the other hand, the second item of the formula (19) represents that, when the i-th base vector $s_i$ of the self-variation subspace $S_{all}$ is projected onto the constraint subspace, the sum of the projection length $Cs_i$ is as small as possible.

$$\sum_{i=1}^{N1} |Cb_i|^2 = \sum_{i=1}^{N1} (C^T b_i)^T (C^T b_i) \qquad (20)$$

$$= \sum_{i=1}^{N1} tr\!\left((C^T b_i)(C^T b_i)^T\right)$$

$$= tr\!\left(C^T \sum_{i=1}^{N1} (b_i b_i^T) C\right)$$

By using $$\text{``}P_b = \sum_{i=1}^{N1} b_i b_i^T\text{''},$$

the formula (20) is represented as follows.

$$\sum_{i=1}^{N1} |Cb_i|^2 = tr(C^T P_b C) \qquad (21)$$

$$\sum_{i=1}^{N2} |Cs_i|^2 = \sum_{i=1}^{N2} (C^T s_i)^T (C^T s_i) \qquad (22)$$

$$= \sum_{i=1}^{N2} tr\!\left((C^T s_i)(C^T s_i)^T\right)$$

$$= tr\!\left(C^T \sum_{i=1}^{N2} (s_i s_i^T) C\right)$$

By using $$\text{``}P_s = \sum_{i=1}^{N2} s_i s_i^T\text{''},$$

the formula (22) is represented as follows.

$$\sum_{i=1}^{N2} |Cs_i|^2 = tr(C^T P_s C) \qquad (23)$$

As a result, the formula (19) is represented as follows.

$$f = tr(C^T (P_b - P_s) C) \qquad (24)$$

Accordingly, a problem to calculate C, of which the standard value f is maximum, is concluded to following problem of variations to calculate C, of which "$tr(C^T \Omega C)$" is maximum, in case of constraint condition "$C^T \cdot C = 1$".

$$J(C) = tr(C^T \Omega C) - tr(C^T C - I)\Lambda \qquad (25)$$

$\Lambda$: D-dimensional diagonal matrix, $\Omega = P_b - P_s$

The formula (25) is partial differentiated and replaced as "0".

$$2\Omega C - 2C\Lambda = 0 \qquad (26)$$

The formula (26) is represented as follows.

$$C^T \Omega C = \Lambda \quad (27)$$

In the formula (27), C is diagonal matrix of $\Omega$. In the eigenvalues of $\Omega$, assume that the eigenvalue of D units in order of larger value is $\lambda i (\lambda 1 >= \lambda 2 \ldots >= \lambda d)$.

$$\text{Max}(f) = \max(tr(C^T \Omega C)) \quad (28)$$
$$= \max(tr(\Lambda))$$
$$= \sum_{i=1}^{d} \lambda i$$

Accordingly, the constraint subspace to be obtained is a subspace in which the eigenvectors corresponding to span of the eigenvalues of D units.

Figure 9:
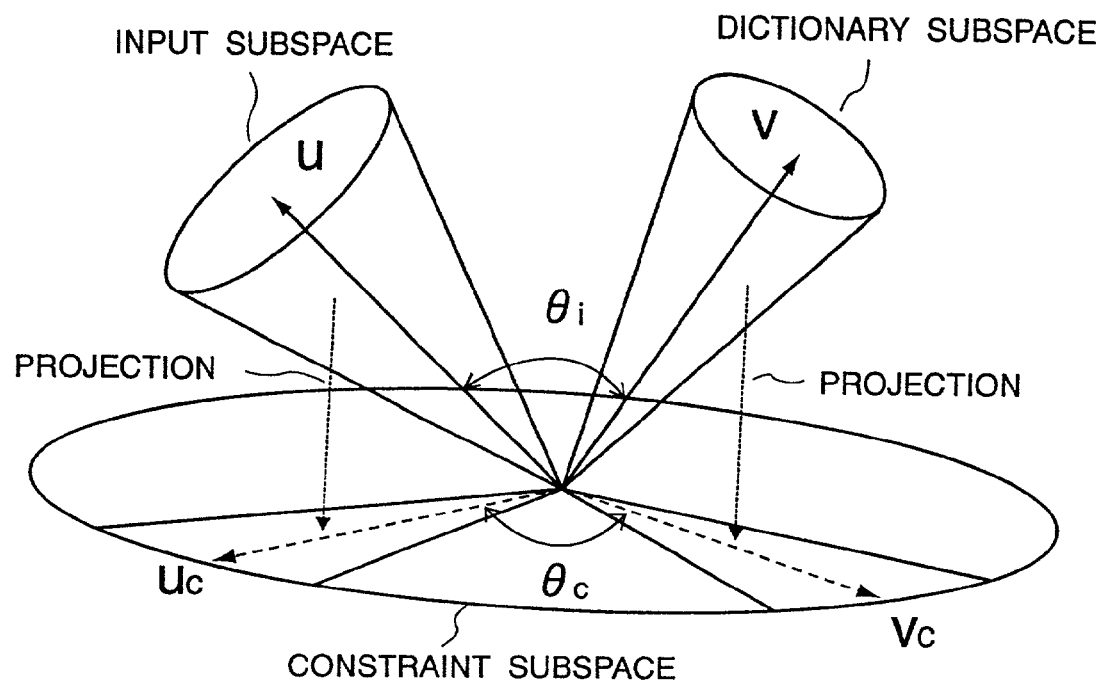
FIG. 9 is a schematic diagram of projection of an input subspace and a dictionary subspace onto a constraint subspace according to an embodiment of the present invention.

FIG. 9 is a schematic diagram of an example projection of an input subspace and a dictionary subspace onto the constraint subspace in an embodiment of the present invention. As for the pattern comparison processing, as shown in FIG. 9, the input subspace U and the dictionary subspace V are projected onto the constraint subspace. Angle $\theta c$ between the projected subspace Uc and the projected subspace Vc represents the similarity degree between the input subspace U and the dictionary subspace V. Furthermore, this particular similarity degree does not include the similarity of the input pattern between two neighboring targets and difference of the input pattern between different times for the same target. In this way, both the input subspace and the dictionary subspace can be converted to a subspace including above-mentioned feature. As a result, accuracy of gaze detection improves. For example, as for the similarity degree between two dictionary subspaces corresponding to two neighboring targets (A, B), a difference between two input patterns of the user who respectively gazes at two targets (A, B) is small. As a result, a difference between the similarity degrees of the input pattern for the two dictionary patterns A and B is also small. Accordingly, the decision on whether the user is gazing at the target A or the target B is difficult. However, by projecting the input pattern and the dictionary pattern onto the constraint subspace, a difference between patterns for two targets (A, B) is emphasized. Concretely, when the user gazes at the target A, a difference between the similarity degrees of the input pattern for the dictionary patterns A and B becomes large. As a result, the decision on whether the user is gazing at the target A or the target B is easier.

Returning to FIG. 1, the gaze detection unit 5 decides that the user is gazing at the target corresponding to the dictionary pattern of which the similarity degree (comparison result by the pattern comparison unit 3) is the highest, and outputs the decision result. Alternatively, the gaze detection unit 5 estimates a gaze position from the decision result for a plurality of targets, and outputs the decision result. As a method for estimating the gaze position from the decision result, for example, each target of which comparison result is higher in rank is extracted from the plurality of targets and interpolated according to the position of each target. Furthermore, except for above-mentioned linear interpolation, a neural net may be used.

Next, the driving support apparatus according to the second embodiment is explained. In the second embodiment, it is not necessary for the driver to set a camera to input an image of a head area including the driver's face. Parameters such as a camera direction, a position, and a focus distance, are automatically set to the camera. Based on the input image from the camera, the driver's gaze is detected using pattern recognition.

Figure 10:
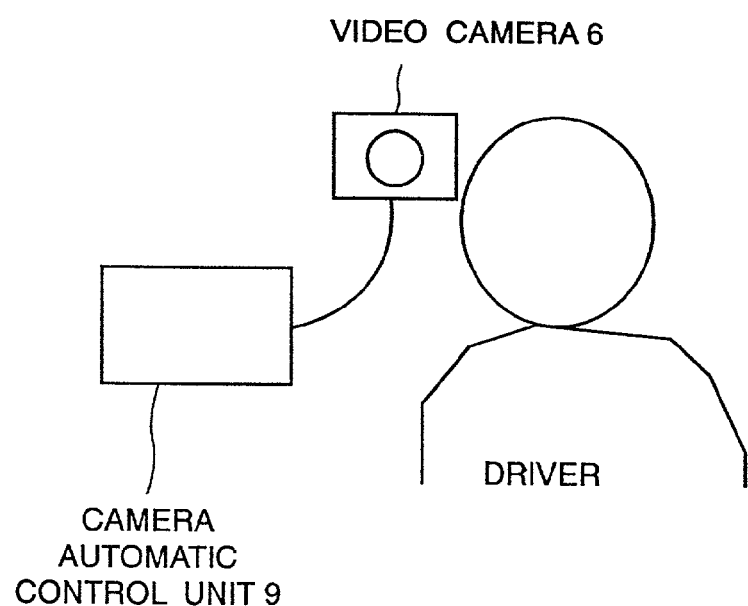
FIG. 10 is a block diagram of an image input unit of a driving support apparatus according to a second embodiment of the present invention.

Components of the driving support apparatus of the second embodiment include those in the first embodiment in FIG. 1. FIG. 10 is a block diagram of the image input unit 1 of the second embodiment. In FIG. 10, a camera automatic control unit 9 detects a part of the driver from the image inputted from a video camera 6, and changes a parameter, such as camera direction, to a posture estimated to input the driver's face image by referring to a position of the part of the driver. This processing is repeated until the input image includes the driver's face area. As a method for confirming whether the driver's face area is included in the image, a template of a person's face image is previously created. By comparing the input image with the template, it is decided whether the driver's face area is included in the image. Once the driver's face area is detected, the camera parameter is easily changed by pursuing the face area in a series of images overtime. The processing following from the pattern generation unit 2 is same as in the first embodiment.

Figure 11:
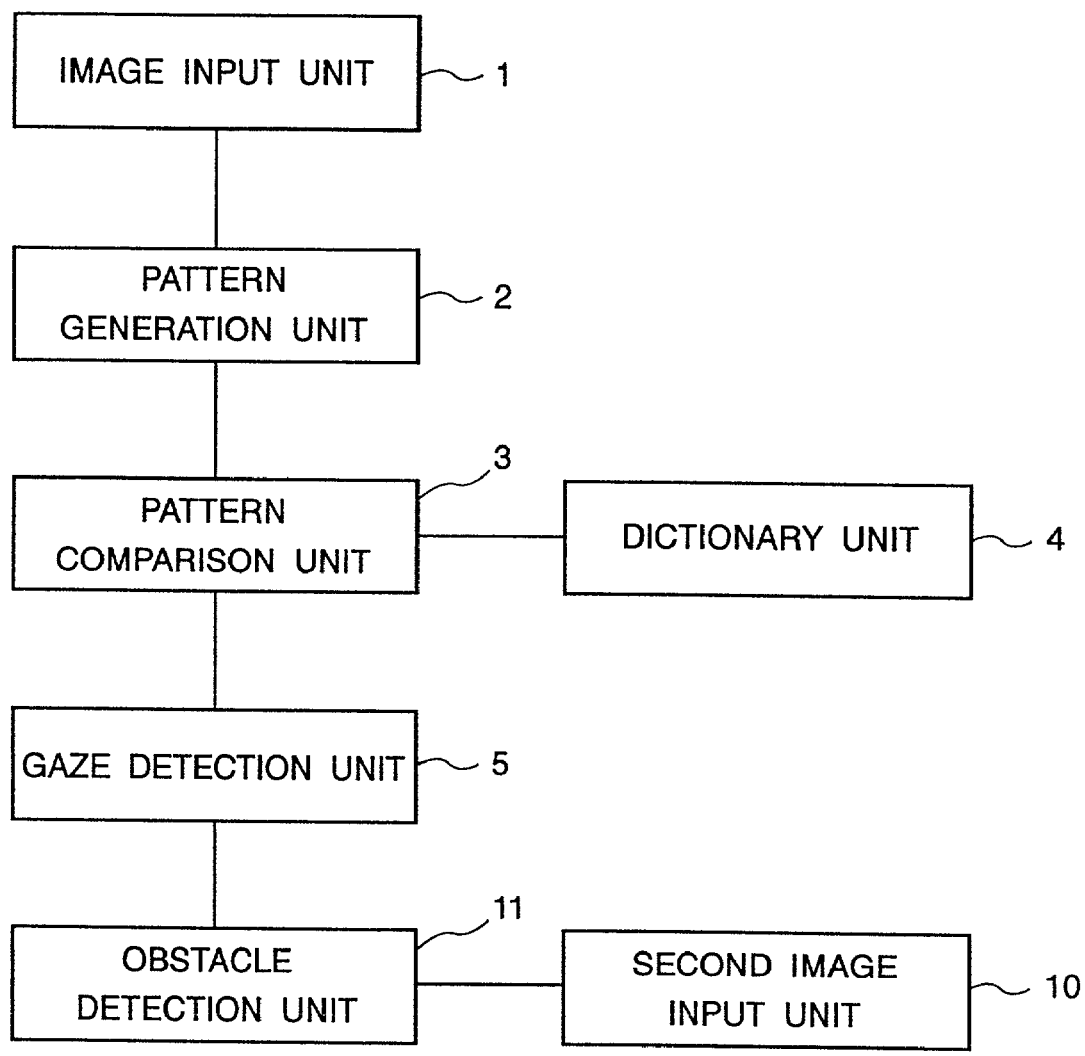
FIG. 11 is a block diagram of the driving support apparatus according to a third embodiment of the present invention.

Next, the driving support apparatus of the third embodiment is explained. In the third embodiment, detection of an obstacle outside the vehicle is effectively executed using a detection result of the driver's gaze. FIG. 11 is a block diagram of the driving support apparatus according to the third embodiment. As shown in FIG. 11, the driving support apparatus includes the image input unit 1, the pattern generation unit 2, the pattern comparison unit 3, the dictionary unit 4, the gaze detection unit 5, a second image input unit 10, and an obstacle detection unit 11. The image input unit 1, the pattern generation unit 2, the pattern comparison unit 3, the dictionary unit 4, and the gaze detection unit 5 are the same as in the first and second embodiments. The second image input unit 10 inputs the image outside the vehicle, such as a road, another vehicle, or a pedestrian. The obstacle detection unit 11 executes the following processing based on the image inputted from the second image input unit 10. Based on the driver's gaze direction detected by the gaze detection unit 5, the obstacle detection unit 11 detects an obstacle existing only in an area in which the gaze direction is not included, i.e., an area selected outside the driver's view. As a method for detecting an obstacle, for example, a technique described in Japanese Patent Disclosure (Kokai) PH9-259282 is used. As a method for changing the area to be processed, a first method for changing the input image itself by moving the second image input unit 10, and a second method for changing the area to be processed in the input image while the image is inputted from the second image input unit 10 at the same posture, are considered. Both methods are effective. However, the latter is more effective because of non-movability of the second image input unit 10. If the driver's condition such as sleeping is detected by another means, all area of the input image may be processed. In short, the method for changing the area to be processed may be combined with the driver's condition.

The present invention is not limited to above-mentioned embodiments. In the first and second embodiments, the pattern generation unit 2 generates a pattern by mosaicking all of the area of the input image without limiting the face area. However, the face area may be previously detected by using a difference of background, a difference between frames, or a face pattern. Then, the face area is only used for pattern generation. In this case, the processing burden increases because of cost of detection or error detection. However, if it is succeeded, the gaze detection of high accuracy can be executed.

Furthermore, an example method for detecting one or more facial feature points, such as eyes and nostrils, is disclosed in "Facial Feature Point Extraction Method Based on Combination of Shape Extraction and Pattern Matching": Kazuhiro FUKUI and Osamu YAMAGUCHI, vol. J80 DII. no. 9. pp. 2170–2177. August 1997. Using such a method, the driver's gaze may be more accurately detected. In this case, a gaze detection method described in Japanese Patent Disclosure (Kokai) PH11-175246 is also applicable.

In the camera control unit 8 of the first embodiment, or in the camera automatic control unit 9 of the second embodiment, assume that a unit to identify the driver automatically or by hand-operation is prepared. If the driver is identified, a position of the driver's face or head is easily detected by referring to his/her stature or a habit of stability style. In other words, a suitable parameter such as the camera direction can be estimated. As a result, processing of the camera control unit 8 or the camera automatic control unit 9 can be reduced.

In the pattern generation unit 2 of the first and second embodiment, a mosaic pattern of the input image is simply used as the input pattern. However, the input pattern may be executed by various transformations, such as Fourier transform, differentiation, emboss processing, and Affine transform. Especially, a Fourier spectral pattern obtained by Fourier transform is invariant for a parallel-moving input image. Accordingly, robust gaze detection for changing head position is possible. In the case of applying these features, the constraint subspace is generated from these feature quantities. In the case of utilizing Fourier transform, a Fourier transform may be executed from a mosaic pattern of the input image. Alternatively, the input image previously executed by Fourier transform may be processed by mosaicking. Furthermore, in order to execute a fast Fourier transform, it is desired that a size of the image to be executed by Fourier transform be an exponent of "2". Furthermore, before and after Fourier transforms on the image provide a degree of noise reduction for the image.

In the first, second and third embodiments, the dictionary pattern of the dictionary unit 4 is previously created or stored. However, whenever adjustment of the camera is executed, the dictionary pattern may be re-created or stored again. In this case, an indication that a driver gazes at a target is presented to the driver visually using the image display apparatus or audibly using the speaker. Whenever the driver gazes at each target, a plurality of images of the driver's face gazing each target can be collected. The dictionary pattern corresponding to each target can be created from the plurality of images. In this case, the dictionary pattern may be created at each indication time, or may be added to the existing dictionary. Furthermore, this creation processing can be performed when the driver moves but also when the target, such as a mirror, changes position.

In the first, second and third embodiments, the camera control unit is used. However, if the position and direction of the camera is previously set at a suitable location, and if the driver's stature and posture does not change largely, the camera control unit is not always necessary.

In the first, second and third embodiments, one camera is utilized. However, a plurality of cameras may be utilized in other embodiments of the invention. For example, if images input from the plurality of cameras are unified and gaze detection is possible by the same processing. In this case, view of all cameras is wider and the gaze detection of high accuracy is possible. Furthermore, processing may be independently executed for each camera, and these processing results may be unified.

In the first, second and third embodiments, the driver's gaze (target point itself) is detected. However, the driver's face direction toward the target point may be detected. For example, in the driver's existing space inside the vehicle, the driver's face position is previously determined while he/she is sitting on the seat. Accordingly, a direction from the driver's face position to the detected target position can be calculated as the driver's face direction.

In the first, second and third embodiments, by using a high sensitivity camera, a high dynamic-range camera, or an infrared ray illumination, stable operation in the evening is possible.

In the first, second and third embodiments, a driver in a vehicle is regarded as the object of the image. However, the present invention can be applied to various other non-driver and non-vehicle situations. For example, the driver could be replaced by a person operating a machine such as a personal computer in office. In this case, the image processing apparatus of the present invention can be utilized as a pointing device, and support of menu selection and mouse operation can be realized by gaze detection. Furthermore, by utilizing a camera to which an information terminal such as a cellular-phone is loaded, a pointing device using the operator's face direction can be realized.

In the first, second and third embodiments, a method for continuously detecting the user's gaze is described. However, in the present invention, by connecting with a helm angle sensor or a pressure sensor of sheet, the gaze may be detected at only necessary time. For example, by using the helm angle sensor, it is decided whether the driver is handling the vehicle. Accordingly, the gaze is not detected while the driver is not handling the vehicle.

In the first, second and third embodiments, the gaze is detected by referring to dynamic images from the video camera 6. However, a static image including the face area may be utilized instead of the dynamic images.

As mentioned-above, in the present invention, the user's area to specify the gaze, viewpoint, or face direction is input by the camera, and the input pattern is matched with the dictionary pattern corresponding to each target position to be gazed by the user. Accordingly, the image processing system and the driving support system for detecting the user's gaze without effect of variation of illumination condition and head position can be realized.

A memory can be used to store instructions for performing the process described above. The process may be performed with the aid of a general purpose computer or microprocessor. Such a memory can thus be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. Driving support apparatus for a driver of a vehicle, comprising;
    an image input unit configured to input an image including the driver's face area to specify the driver's gaze or face direction;
    a pattern generation unit configured to generate an input pattern from the image that can be compared with each of a plurality of dictionary patterns each of which differently corresponds to the driver's gaze or face direction;

a dictionary unit configured to store the plurality of dictionary patterns;

a pattern comparison unit configured to respectively calculate a similarity degree between the input pattern and each of the dictionary patterns by comparing the input pattern with each of the dictionary patterns;

a gaze detection unit configured to detect the driver's gaze or face direction based on the similarity degree;

an obstacle detection area selection unit configured to select an area outside of the driver's view based on the driver's gaze or face direction, the area representing an obstacle detection area for the vehicle; and an obstacle detection unit configured to detect an obstacle existing in the obstacle detection area.

2. The driving support apparatus according to claim 1, wherein said image input unit previously inputs a plurality of images of the driver's face area while the driver gazes at each of a plurality of targets being differently located in the driver's view space, and wherein said dictionary unit generates the dictionary pattern using the plurality of images for each of the targets.

3. The driving support apparatus according to claim 2, wherein the dictionary pattern of each of the targets is a subspace generated from the plurality of images for each of the targets, and wherein said dictionary unit generates a difference subspace between two classes, the two classes being two of the targets that are closely located.

4. The driving support apparatus according to claim 3, wherein said dictionary unit generates a common subspace from each difference subspace between each combination of two classes of the targets.

5. The driving support apparatus according to claim 4, wherein said image input unit previously inputs the plurality of images of the driver's face area whenever the driver gazes at the same target at different times, the plurality of images being input for each of the targets, and wherein said dictionary unit generates a second difference subspace between two different times for the same target.

6. The driving support apparatus according to claim 5, wherein said dictionary unit generates a second common subspace from each of the second difference subspaces between two different times for all of the targets, the second common subspace being a self-variation subspace for the driver.

7. The driving support apparatus according to claim 6, wherein said dictionary unit generates a constraint subspace by subtracting the self-variation subspace from the difference subspace between the targets.

8. The driving support apparatus according to claim 7, wherein said pattern comparison unit respectively projects a subspace of the input pattern and a subspace of the dictionary pattern onto the constraint subspace, and calculates an angle between the projected subspace of the input pattern and the projected subspace of the dictionary pattern, the angle representing the similarity degree between the input pattern and the dictionary pattern.

9. The driving support apparatus according to claim 8, wherein said pattern comparison unit calculates the similarity degree between the projected subspace of the input pattern and the projected subspace of the dictionary pattern by using a subspace method or a mutual subspace method.

10. Driving support method for a driver of a vehicle, comprising:

inputting an image including the driver's face area to specify the driver's gaze or face direction;

generating an input pattern from the image that can be compared with each of a plurality of dictionary patterns each of which differently corresponds to the driver's gaze or face direction;

storing the plurality of dictionary patterns;

respectively calculating a similarity degree between the input pattern and each of the dictionary patterns by comparing the input pattern with each of the dictionary patterns;

detecting the driver's gaze or face direction based on the similarity degree;

selecting an area outside of the driver's view based on the driver's gaze or face direction, the area representing an obstacle detection area for the vehicle; and detecting an obstacle existing in the obstacle detection area.

11. A computer program product, comprising:

a computer readable program code embodied in said product for causing a computer to support driving of a vehicle, said computer readable program code having:

a first program code to input an image including the driver's face area to specify the driver's gaze or face direction;

a second program code to generate an input pattern from the image that can be compared with each of a plurality of dictionary patterns each of which differently corresponds to the driver's gaze or face direction;

a third program code to store the plurality of dictionary patterns;

a fourth program code to respectively calculate a similarity degree between the input pattern and each of the dictionary patterns by comparing the input pattern with each of the dictionary patterns;

a fifth program code to detect the driver's gaze or face direction based on the similarity degree;

a sixth program code to select an area outside of the driver's view based on the driver's gaze or face direction, the area representing an obstacle detection area for the vehicle; and a seventh program code to detect an obstacle existing in the obstacle detection area.

* * * * *